(12) United States Patent
Kim et al.

(10) Patent No.: US 11,777,118 B2
(45) Date of Patent: Oct. 3, 2023

(54) METHOD OF CONTROLLING START/STOP OF PARALLEL FUEL CELL SYSTEM

(71) Applicants: HYUNDAI MOTOR COMPANY, Seoul (KR); KIA CORPORATION, Seoul (KR)

(72) Inventors: Sung Do Kim, Seoul (KR); Joo Yeon Kim, Seoul (KR); Min Su Kang, Paju-si (KR); Chang Seok You, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/743,125

(22) Filed: May 12, 2022

(65) Prior Publication Data
US 2023/0071079 A1     Mar. 9, 2023

(30) Foreign Application Priority Data

Sep. 6, 2021 (KR) .................. 10-2021-0118089

(51) Int. Cl.
| | |
|---|---|
| *H01M 8/04* | (2016.01) |
| *H01M 8/04303* | (2016.01) |
| *H01M 8/04225* | (2016.01) |
| *H01M 8/04228* | (2016.01) |
| *H01M 8/04313* | (2016.01) |
| *H01M 8/04955* | (2016.01) |
| *H01M 8/04302* | (2016.01) |

(52) U.S. Cl.
CPC ... *H01M 8/04303* (2016.02); *H01M 8/04225* (2016.02); *H01M 8/04228* (2016.02); *H01M 8/04302* (2016.02); *H01M 8/04313* (2013.01); *H01M 8/04955* (2013.01); *H01M 2250/20* (2013.01)

(58) Field of Classification Search
CPC ........ H01M 8/04303; H01M 8/04225; H01M 8/04228; H01M 8/04302
See application file for complete search history.

(56) References Cited

U.S. PATENT DOCUMENTS

2012/0270126 A1* 10/2012 Matsumoto ....... H01M 8/04492
429/429

* cited by examiner

*Primary Examiner* — Olatunji A Godo
(74) *Attorney, Agent, or Firm* — MCDONNELL BOEHNEN HULBERT & BERGHOFF LLP

(57) ABSTRACT

Disclosed herein is a method of controlling start/stop of a parallel fuel cell system, which, when controlling stop of a parallel fuel cell system in which two or more fuel cell systems are connected in parallel, considers operating state information of each fuel cell system, such as a current speed value of an air compressor and an opening degree of an air-exhaust-side air pressure valve of a fuel cell stack. Accordingly, the method can calculate a delay time for performing fuel cell system stop control for the two or more fuel cell systems, and sequentially perform the fuel cell system stop control for the two or more fuel cell systems based on the calculated delay time. Therefore, it is possible to minimize output delay of each fuel cell system and to achieve deterioration prevention and efficiency improvement of the fuel cell stack by fuel cell system start/stop control.

15 Claims, 11 Drawing Sheets

Prior Art

Prior Art

Prior Art

- Abs(M1_T_hold - M2_T_hold) > T_align -

METHOD OF CONTROLLING START/STOP OF PARALLEL FUEL CELL SYSTEM

CROSS REFERENCE TO RELATED APPLICATIONS

This application claims under 35 U.S.C. § 119(a) the benefit of priority to Korean Patent Application No. 10-2021-0118089 filed on Sep. 6, 2021, the entire contents of which are incorporated herein by reference.

BACKGROUND

(a) Technical Field

The present disclosure relates to a method of controlling start/stop of a parallel fuel cell system. More particularly, the disclosure relates to a method of controlling start/stop of a parallel fuel cell system, which is capable of preventing output delay and deterioration of a parallel fuel cell system having two or more fuel cell stacks connected to each other and so on.

(b) Background Art

In general, a fuel cell system includes a fuel cell stack that generates electric energy, a hydrogen supply system that supplies fuel (hydrogen) to the fuel cell stack, an air supply system that supplies oxygen in the air, as an oxidant required for an electrochemical reaction, to the fuel cell stack, a heat and water management system that controls the operating temperature of the fuel cell stack, etc.

The fuel cell stack consists of a plurality of unit cells stacked and assembled to generate electric energy by reacting hydrogen ($H_2$) and oxygen ($O_2$). Each of the unit cells may be composed of an electrolyte membrane, an anode electrode positioned on one side of the electrolyte membrane to be supplied with hydrogen ($H_2$), a cathode electrode positioned on the other side of the electrolyte membrane to be supplied with air, and a gas diffusion layer stacked outside the anode electrode and the cathode electrode.

In the reaction for generating electricity of the fuel cell stack, the hydrogen supplied to the anode electrode as an oxidation electrode is dissociated into hydrogen ions (protons) and electrons. Then, the hydrogen ions are transmitted to the cathode electrode, as a reduction electrode, through the electrolyte membrane, and the electrons are transmitted to the cathode electrode through an external circuit. At the cathode electrode, the oxygen molecules, the hydrogen ions, and the electrons react with each other to generate electricity and heat, and at the same time, producing water ($H_2O$) as a reaction by-product.

Meanwhile, in order to prevent deterioration of the fuel cell stack and improve power generation efficiency, fuel cell system start/stop control is used to stop and resume the operation of the fuel cell system. In the fuel cell system start/stop control, stop control may be used when stopping an air compressor for supplying air to the fuel cell stack, and start control may be used when reactuating the air compressor.

For reference, the stop and reactuation of the air compressor refers to stop and reactuation of a motor included in the air compressor.

In this case, in order to secure reliability when attempting to reactuate the motor in a stopped state, sensorless motor position control is used to perform a rotor initial position alignment function for checking the position of the rotor of the motor.

The rotor initial position alignment function of the motor through the sensorless motor position control refers to a technology that applies a current (d-axis current), which does not contribute to torque, for a certain time to fix the rotor.

However, when the rotor initial position alignment function is performed by the sensorless motor position control, the d-axis current that does not directly generate the torque of the motor must be applied to the motor for a certain time, which makes it difficult to immediately reactuate the motor.

In addition, if the current of the fuel cell stack is required immediately after the fuel cell system is stopped by the fuel cell system start/stop control, that is, after the air compressor is stopped by the fuel cell system start/stop control, the rotor initial position alignment function is performed by the sensorless motor position control, as described above, so that the immediate reactuation of the motor (i.e., the immediate reactuation of the air compressor) is delayed. Consequently, the supply of air to the fuel cell stack is delayed, which leads to delay of the current output of the fuel cell stack.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

In an aspect, the present disclosure provides a method of controlling start/stop of a parallel fuel cell system, which, when controlling stop of a parallel fuel cell system in which two or more fuel cell systems are connected in parallel, considers operating state information of each fuel cell system, such as a current speed value of an air compressor, whether regenerative braking of the air compressor is performed, and an opening degree of an air-exhaust-side air pressure valve of a fuel cell stack. Accordingly, the method can calculate a delay time for performing fuel cell system stop control for the two or more fuel cell systems, and sequentially perform the fuel cell system stop control for the two or more fuel cell systems without simultaneously performing it based on the calculated delay time. Therefore, it is possible to minimize output delay of each fuel cell system and to achieve deterioration prevention and efficiency improvement of the fuel cell stack by fuel cell system start/stop control.

In a preferred embodiment, there is provided a method of controlling start/stop of a parallel fuel cell system, which includes calculating a delay time until each fuel cell system stops during stop controls for two or more fuel cell systems constituting a parallel fuel cell system, sequentially performing the stop controls for the two or more fuel cell systems based on the calculated delay time, and entering a fuel cell restart mode when an output of each fuel cell system is required when the stop controls for the two or more fuel cell systems are sequentially performed.

The calculating a delay time may include determining, from a map table of a controller, a stop time until a first air compressor of a first fuel cell system stops and a stop time until a second air compressor of a second fuel cell system stops, determining a first delay time based on the stop time until the first air compressor stops and a time for which a rotor initial position alignment function is performed for checking a position of a rotor of a motor included in the first air compressor, and determining a second delay time based on the stop time until the second air compressor stops and a time for which a rotor initial position alignment function is performed for checking a position of a rotor of a motor included in the second air compressor.

The map table may be composed of a speed profile representing a current speed over time during deceleration for stopping the first and second air compressors, according to an opening degree of a first air pressure valve mounted at an outlet of a cathode of a first fuel cell stack and an opening degree of a second air pressure valve mounted at an outlet of a cathode of a second fuel cell stack.

When a difference between the stop time of the first air compressor and the stop time of the second air compressor is equal to or greater than a rotor alignment delay time, it may be determined that the first delay time does not overlap with the second delay time so that the first delay time is determined to be zero and the second delay time is also determined to be zero.

When the first delay time is determined to be zero and the second delay time is also determined to be zero, the controller may simultaneously command stop controls for the first and second fuel cell systems to simultaneously perform a first fuel cell system stop mode and a second fuel cell system stop mode.

When a difference between the stop time of the first air compressor and the stop time of the second air compressor is less than a rotor alignment delay time, and when the stop time of the second air compressor is less than the stop time of the first air compressor, the first delay time may be determined to be zero and the second delay time may be determined to be a value obtained by subtracting the difference from the rotor alignment delay time.

When the first delay time is determined to be zero and the second delay time is determined to be the value obtained by subtracting the difference from the rotor alignment delay time, the controller may first command first fuel cell system stop control and then command second fuel cell system stop control after the second delay time, to first perform a first fuel cell system stop mode and then perform a second fuel cell system stop mode in sequence.

When a difference between the stop time of the first air compressor and the stop time of the second air compressor is less than a rotor alignment delay time, and when the stop time of the first air compressor is less than the stop time of the second air compressor, the second delay time may be determined to be zero and the first delay time may be determined to be a value obtained by subtracting the difference from the rotor alignment delay time.

When the second delay time is determined to be zero and the first delay time is determined to be the value obtained by subtracting the difference from the rotor alignment delay time, the controller may first command second fuel cell system stop control and then command first fuel cell system stop control after the first delay time, to first perform a second fuel cell system stop mode and then perform a first fuel cell system stop mode in sequence.

When an output of each fuel cell system is required when stop controls for first and second fuel cell systems of the two or more fuel cell systems are sequentially performed, after the entering a fuel cell restart mode, the method may further perform determining whether an available output of the first fuel cell system is zero and whether a total required output for each fuel cell system is greater than an available output of the second fuel cell system.

When the available output of the first fuel cell system is zero and the total required output for each fuel cell system is greater than the available output of the second fuel cell system, the method may further perform determining a required output of the first fuel cell system to be zero and determining a required output of the second fuel cell system to be an available output limit of the second fuel cell system, and executing fuel cell restart in response to the determined available output limit of the second fuel cell system.

When the available output of the first fuel cell system is zero and the total required output for each fuel cell system is less than the available output of the second fuel cell system, the method may further perform determining a required output of the first fuel cell system to be zero and determining a required output of the second fuel cell system to be an available output of the second fuel cell system that satisfied the total required output, and executing fuel cell restart in response to the determined available output of the second fuel cell system that satisfied the total required output.

When an output of each fuel cell system is required when stop controls for second and first fuel cell systems of the two or more fuel cell systems are sequentially performed, after the entering a fuel cell restart mode, the method may further perform determining whether an available output of the second fuel cell system is zero and whether a total required output for each fuel cell system is greater than an available output of the first fuel cell system.

When the available output of the second fuel cell system is zero and the total output required for each fuel cell system is greater than the available output of the first fuel cell system, the method may further perform determining a required output of the second fuel cell system to be zero and determining a required output of the first fuel cell system to be an available output limit of the first fuel cell system, and executing fuel cell restart in response to the determined available output limit of the first fuel cell system.

When the available output of the second fuel cell system is zero and the total required output for each fuel cell system is less than the available output of the first fuel cell system, the method may further perform determining a required output of the second fuel cell system to be zero and determining a required output of the first fuel cell system to be an available output of the first fuel cell system that satisfied the total required output, and executing fuel cell restart in response to the determined available output of the first fuel cell system that satisfied the total required output.

Other aspects and preferred embodiments of the disclosure are discussed infra.

It is understood that the term "vehicle" or "vehicular" or other similar term as used herein is inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
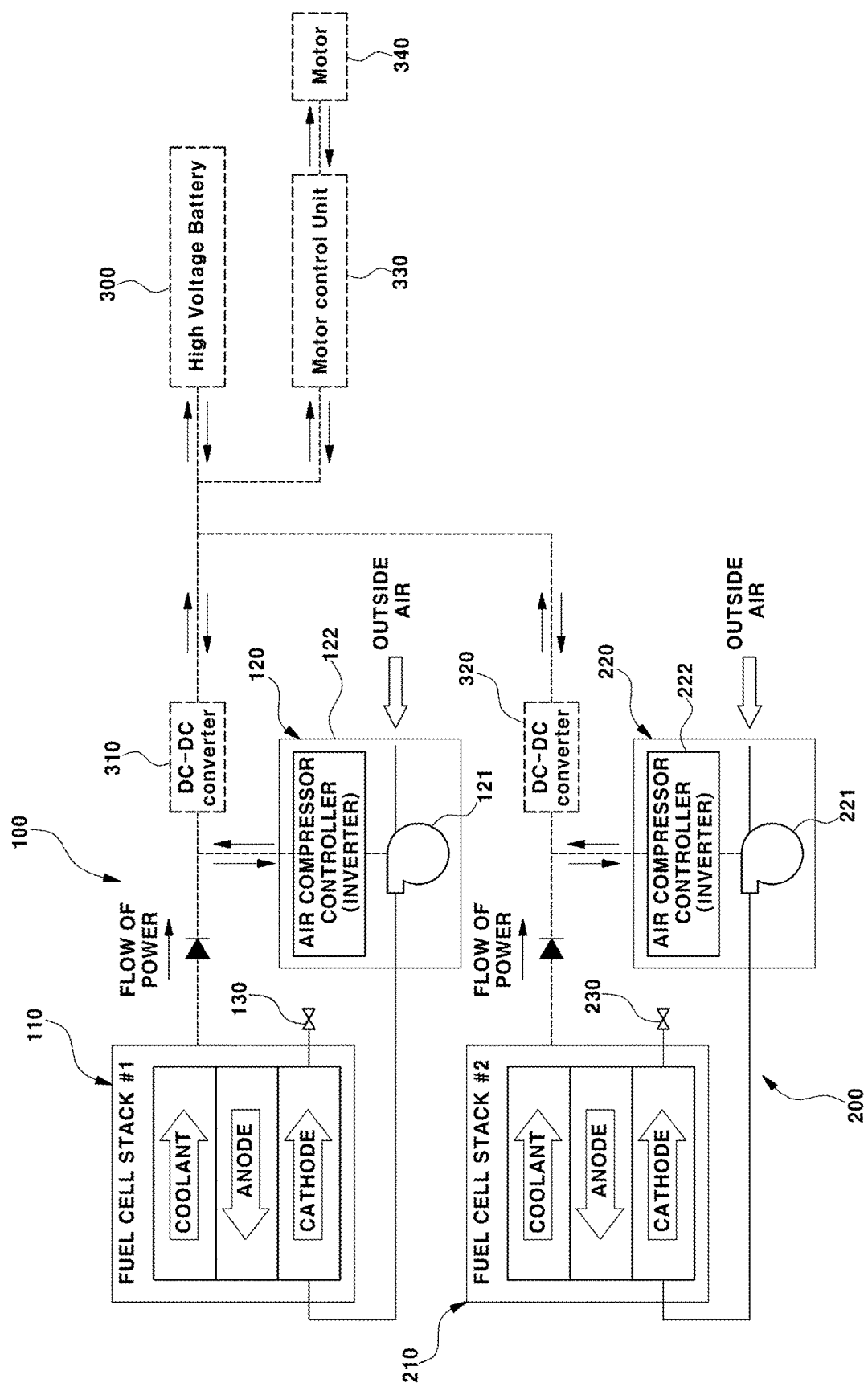
FIG. 1 is a diagram illustrating a configuration in which two or more fuel cell stacks and an air supply system are connected to a power net in a parallel fuel cell system.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

First, the configuration of a parallel fuel cell system in which two or more fuel cell systems are connected in parallel will be described in order to facilitate understanding of the present disclosure.

FIG. 1 is a diagram illustrating a configuration in which two or more fuel cell stacks and an air supply system are connected to a power net in the parallel fuel cell system.

As illustrated in FIG. 1, the parallel fuel cell system is a system in which two or more fuel cell systems are connected in parallel to improve the output of the system. The parallel fuel cell system may include a first fuel cell system 100 that includes a first fuel cell stack 110, a first air supply system 120 configured to supply air to the first fuel cell stack 110, and the like, and a second fuel cell system 200 that includes a second fuel cell stack 210, a second air supply system 220 configured to supply air to the second fuel cell stack 210, and the like, wherein the first and second fuel cell systems 100 and 200 are connected in parallel.

The first air supply system 120 includes a first air compressor 121 configured to supply air to a cathode of the first fuel cell stack 110 and a first inverter 122 configured to control the actuation of the first air compressor 121. The second air supply system 220 includes a second air compressor 221 configured to supply air to a cathode of the second fuel cell stack 210 and a second inverter 222 configured to control the actuation of the second air compressor 221.

Here, a first air pressure valve 130 is mounted at the outlet of the cathode of the first fuel cell stack 110 for exhausting a remaining amount of air, and a second air pressure valve 230 is also mounted at the outlet of the cathode of the second fuel cell stack 210 for exhausting a remaining amount of air.

The power net serves to charge or discharge electric energy, generated by the first and second fuel cell stacks 110 and 210, to or from power consuming components. The power net includes a first DC-DC converter 310 that converts the DC voltage generated by the first fuel cell stack 110 into a voltage for charging a high-voltage battery 300 or a voltage for actuating a motor 340, a second DC-DC converter 320 that converts the DC voltage generated by the second fuel cell stack 210 into a voltage for charging the high-voltage battery 300 or a voltage for actuating the motor 340, the high-voltage battery 300 charged with the DC voltages converted by the first and second DC-DC converters 310 and 320, a motor control unit (MCU) 330 configured to control supply of the power for charging the high-voltage battery 300 to the motor 340, and the like.

In this case, the motor 340 may be a driving motor for a fuel cell vehicle. The motor 340 may be actuated using power discharged from the high-voltage battery 300 or may be actuated by directly receiving power generated by the first and second fuel cell stacks 110 and 210.

The first and second air supply systems 120 and 220 may also be actuated by receiving the charging voltages from the high-voltage battery 300 through the first and second DC-DC converters 310 and 320, respectively.

During normal operation of the parallel fuel cell system having the above configuration, fuel cell system start/stop control may be performed.

The fuel cell system start/stop control refers to control performed to temporarily stop the fuel cell system and then resume the operation thereof during normal operation of the fuel cell system mounted on the fuel cell vehicle, like an idle/stop function of an internal combustion engine vehicle, in order to prevent deterioration of the fuel cell stack and improve power generation efficiency.

Figure 2:
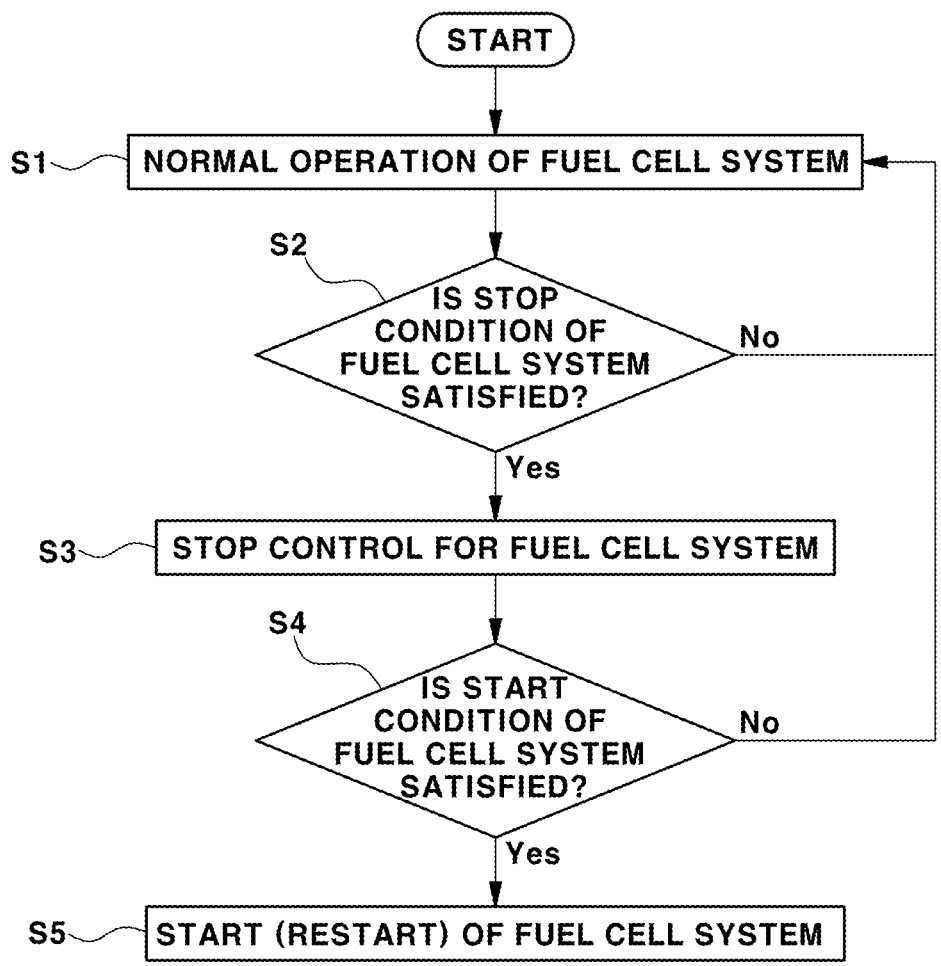
FIG. 2 is a flowchart illustrating a process of fuel cell system start/stop control.

FIG. 2 is a flowchart illustrating a process of the fuel cell system start/stop control.

First, the normal operation of the parallel fuel cell system is performed at S1, for example, the first and second fuel cell stacks 110 and 210 generate current through a reduction reaction of air (oxygen), produced by actuation of the first and second air compressors 121 and 221, and hydrogen supplied from the hydrogen supply system.

Next, a fuel cell controller checks whether a stop condition of the fuel cell system is satisfied at S2.

Next, when the stop condition of the fuel cell system is satisfied, the fuel cell controller performs fuel cell system stop control for stopping the first and second air compressors 121 and 221 at S3.

Next, the fuel cell controller checks whether a start condition of the fuel cell system is satisfied, in order to operate the fuel cell system again according to a driver's request or a vehicle driving condition at S4.

Next, when the start condition of the fuel cell system is satisfied, the fuel cell controller performs fuel cell system start control for reactuating the first and second air compressors 121 and 221 at S5.

As described above, the fuel cell system start/stop control refers to control performed to temporarily stop the fuel cell system and then resume the operation thereof in order to prevent deterioration of the first and second fuel cell stacks 110 and 210 and improve power generation efficiency. In the fuel cell system start/stop control, the stop control may be used when stopping the first and second air compressors 121 and 221 for supplying air to the first and second fuel cell stacks 110 and 210, and the start control may be used when reactuating the first and second air compressors 121 and 221.

For reference, the stop and reactuation of the first and second air compressors 121 and 221 is performed by stopping and reactuating the motor included in each air compressor.

In this case, after the control for stopping the first and second air compressors 121 and 221 is performed in the fuel cell system start/stop control, a rotor initial position alignment function is performed for checking a position of a rotor of the motor included in each of the air compressors 121 and 122.

In other words, in order to secure reliability when the motor included in the air compressor is reactuated in a stopped state, sensorless motor position control is used to perform the rotor initial position alignment function for checking the position of the rotor of the motor.

The rotor initial position alignment function of the motor through the sensorless motor position control refers to a technology that applies a current (d-axis current), which does not contribute to torque, for a certain time to fix the rotor.

Figure 3:
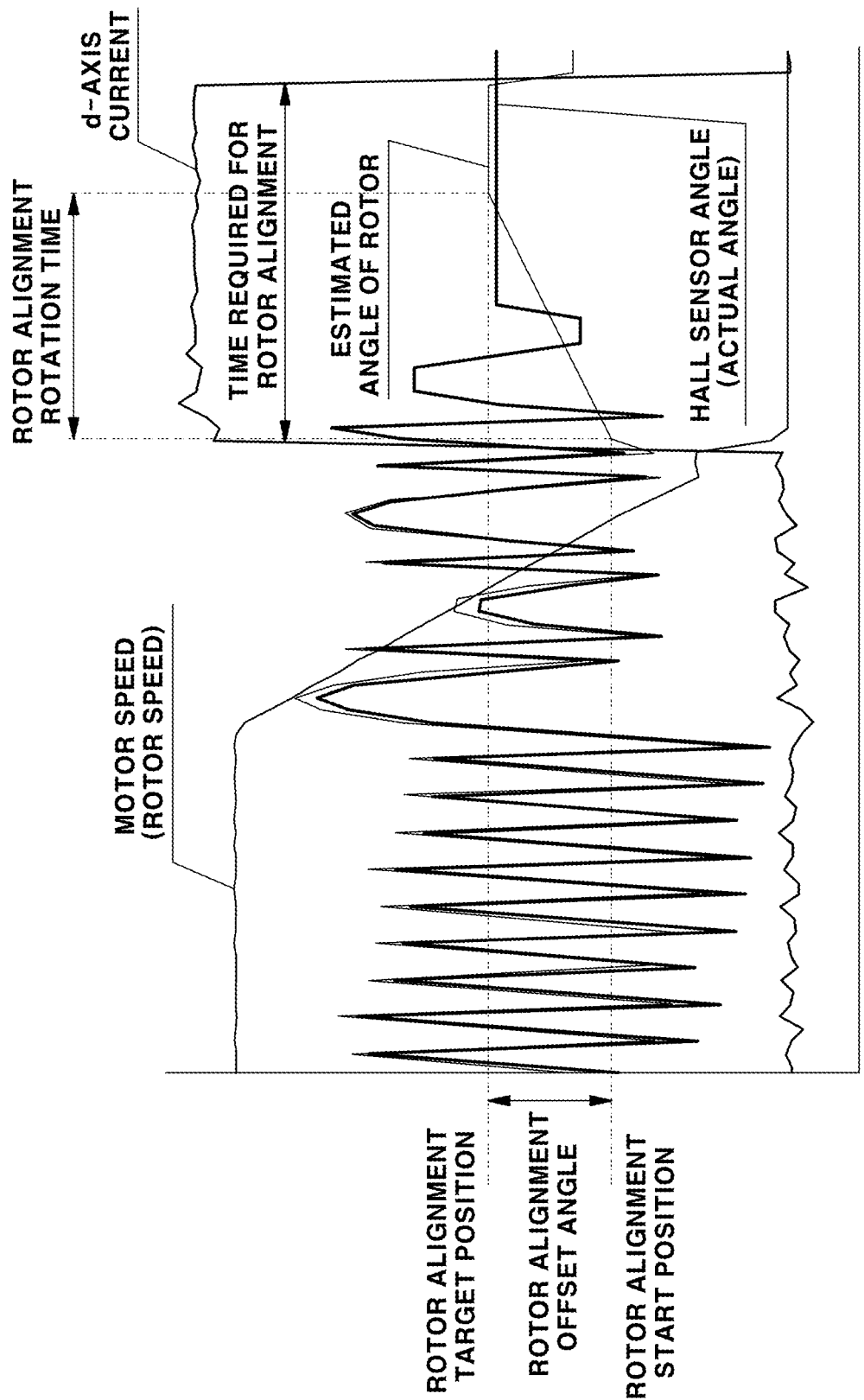
FIG. 3 is a graph illustrating that a rotor initial position alignment function of a motor is performed by sensorless motor position control used in the process of the fuel cell system start/stop control.

Referring to FIG. 3, when the motor of the air compressor enters a sufficiently low-speed section before stopping, a current (d-axis current) that does not contribute to torque is applied for a certain time to fix the position of the rotor of the motor. Since the magnitude and application time of current depend on the characteristics of the motor, they may be determined as calibration factors through experiments.

When the d-axis current is applied, the rotor rotates by a rotor alignment offset angle from a rotor alignment start position to reach a rotor alignment target position. It can be seen that the estimated angle of the rotor at the end of the time required for applying the d-axis current is equal to the actual angle measured by the Hall sensor.

Figure 4:
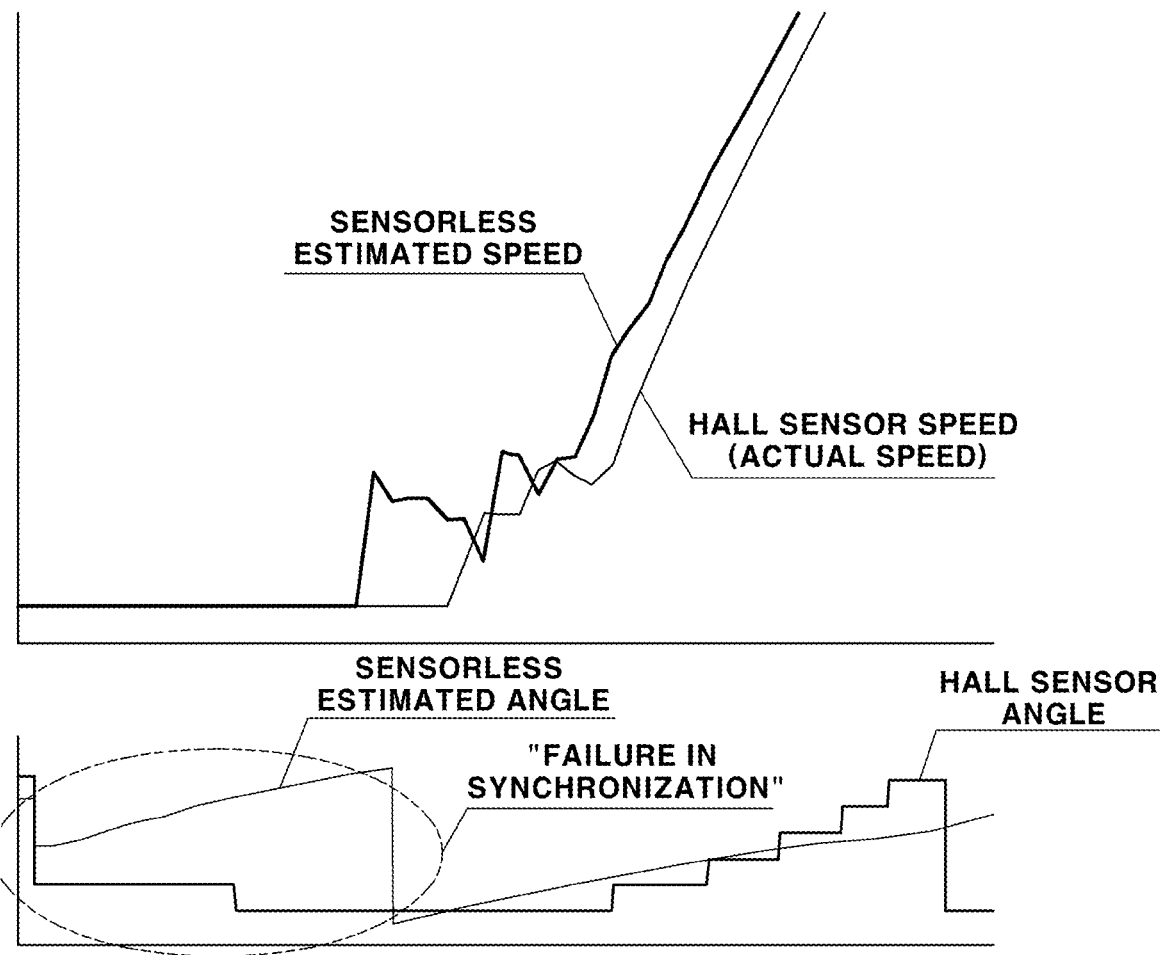
FIG. 4 is a graph illustrating that a motor speed oscillation phenomenon occurs when the rotor initial position alignment function is not performed by the sensorless motor position control.

Referring to FIG. 4, after each air compressor is stopped due to the stop control in the fuel cell system start/stop control, if the rotor initial position alignment function is not performed by the sensorless motor position control so that the position of the rotor of the motor is not known, a speed oscillation phenomenon occurs in which the speed of the motor momentarily varies when current is applied to the motor.

The speed oscillation phenomenon causes motor torque by forming a magnetic field irrespective of the position of the rotor of the motor. This phenomenon is due to failure in synchronization between the rotor and the magnetic field, which may result in the motor failing to start.

Figure 5:
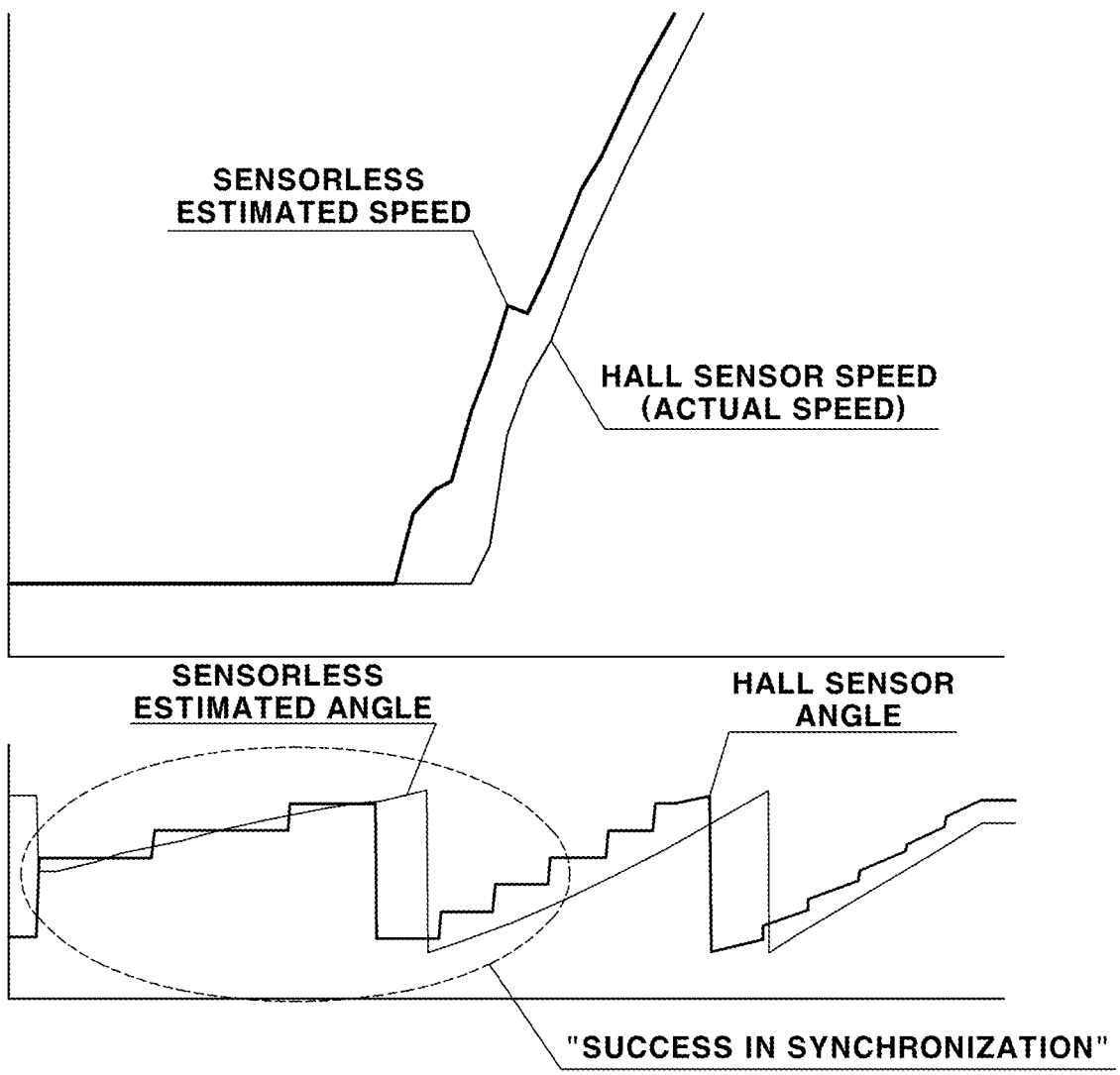
FIG. 5 is a graph illustrating success in synchronization between a rotor and a magnetic field by performing the rotor initial position alignment function through the sensorless motor position control.

Referring to FIG. 5, after each air compressor is stopped due to the stop control in the fuel cell system start/stop control, if the rotor initial position alignment function is performed by the sensorless motor position control so that the position of the rotor of the motor is known, the speed of the motor can be controlled without any speed oscillation phenomenon, which results from success in synchronization between the rotor and the magnetic field.

However, after each air compressor is stopped due to the stop control in the fuel cell system start/stop control, the start control in the fuel cell system start/stop control is performed while the rotor initial position alignment function is performed for checking the position of the rotor of the motor included in each air compressor, the output of the fuel cell system may be delayed.

That is, when the initial position alignment function is performed by the sensorless motor position control, the d-axis current that does not directly cause motor torque must be applied to the motor for a certain time, so that it is difficult, if not impossible to immediately reactuate the motor included in each air compressor. Hence, the output of the fuel cell system may be delayed due to the delay in operation of the air compressor even if the start control in the fuel cell system start/stop control is performed while the rotor initial position alignment function is performed for checking the position of the rotor of the motor.

As such, if the current of the fuel cell stack is required immediately after the fuel cell system is stopped by the fuel cell system start/stop control, that is, after the air compressor is stopped by the fuel cell system start/stop control, the rotor initial position alignment function is performed by the sensorless motor position control, as described above, so that the immediate reactuation of the motor (i.e., the immediate reactuation of the air compressor) is delayed. Consequently, the supply of air to the fuel cell stack is delayed, which leads to delay of the current output of the fuel cell stack.

The present disclosure has been made in an effort to solve the above-described problems. Accordingly, in consideration of operating state information of each fuel cell system, such as a current speed value of each air compressor, whether regenerative braking of the air compressor is performed, and an opening degree of the air-exhaust-side air pressure valve of each fuel cell stack, the present disclosure can calculate a delay time for performing stop control in the fuel cell system start/stop control, and sequentially perform the fuel cell system stop control for the two or more fuel cell systems based on the calculated delay time. Therefore, the present disclosure is focused on minimizing output delay of each fuel cell system and on achieving deterioration prevention and efficiency improvement of the fuel cell stack by fuel cell system start/stop control.

Figure 7:
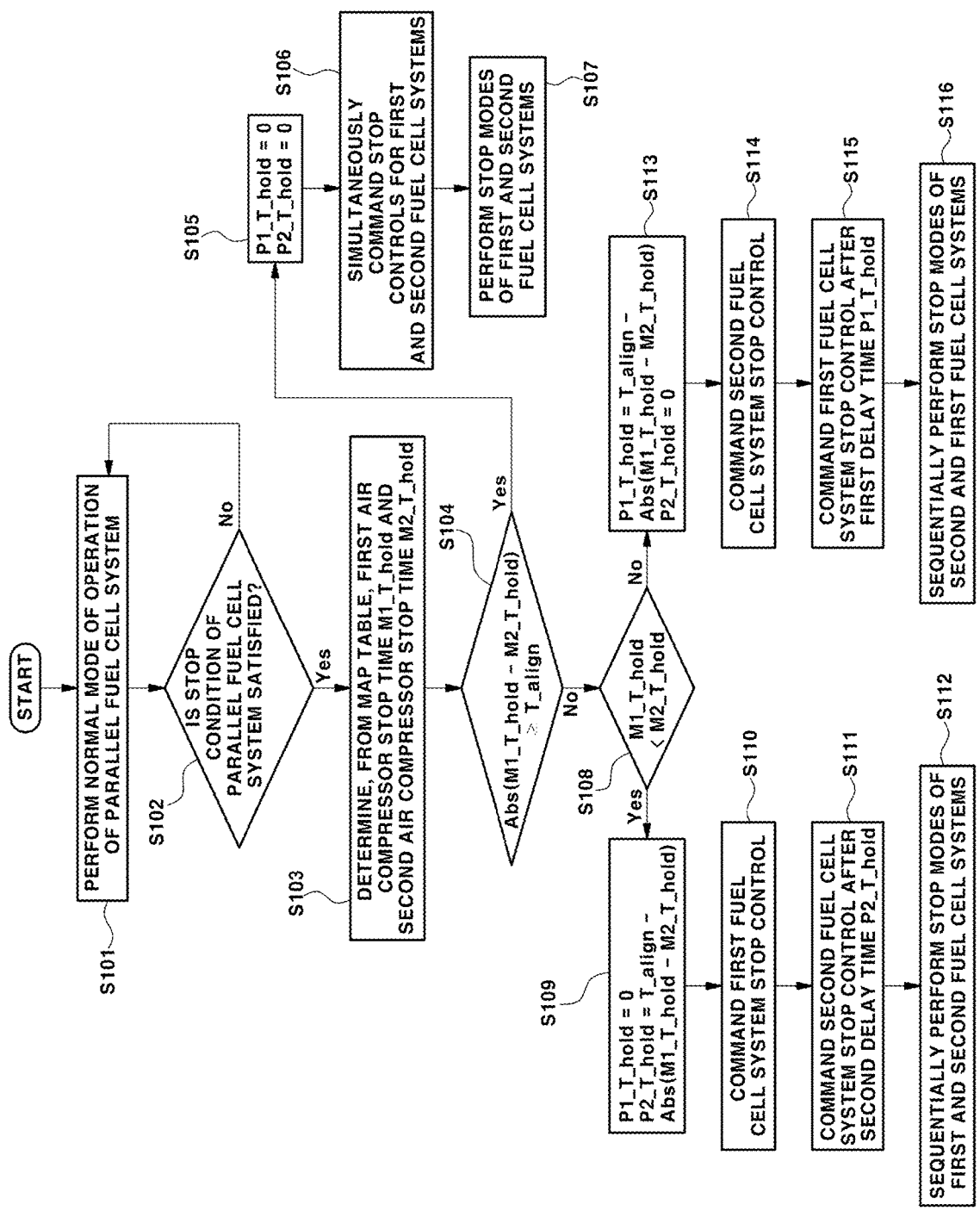
FIG. 7 is a flowchart illustrating a method for stop control in the fuel cell system start/stop control according to the present disclosure.

FIG. 7 is a flowchart illustrating a method controlling stop of a fuel cell system according to the present disclosure.

The method of controlling start/stop of a fuel cell system according to the present disclosure may be performed by cooperative control between the first fuel cell controller and the second fuel cell controller for controlling the respective first and second fuel cell systems, including an uppermost controller of the fuel cell vehicle equipped with the parallel fuel cell system, or may be performed by control of a single integrated controller. Accordingly, the first and second fuel cell controllers, including the uppermost controller, will be collectively referred to as a controller below.

First, a normal mode of operation of the parallel fuel cell system is performed at S101, for example, the first and second fuel cell stacks 110 and 210 generate current through a reduction reaction of air (oxygen), produced by actuation of the first and second air compressors 121 and 221, and hydrogen supplied from the hydrogen supply system.

Next, the controller checks whether a stop condition of the parallel fuel cell system is satisfied at S102.

When the stop condition of the parallel fuel cell system is satisfied, the method performs a step of calculating a delay time until each fuel cell system stops during stop controls for two or more fuel cell systems constituting the parallel fuel cell system, and a step of sequentially performing the stop controls for the two or more fuel cell systems based on the calculated delay time.

In order to calculate the delay time, the controller determines, from a map table, a stop time M1_T_hold until the first air compressor starts to decelerate and stops and a stop time M2_T_hold until the second air compressor starts decelerates and stops at S103.

In this case, the map table may be established through mapping experiments in advance and may be stored in the controller in order to obtain the first air compressor stop time M1_T_hold and the second air compressor stop time M2_T_hold.

Figure 6:
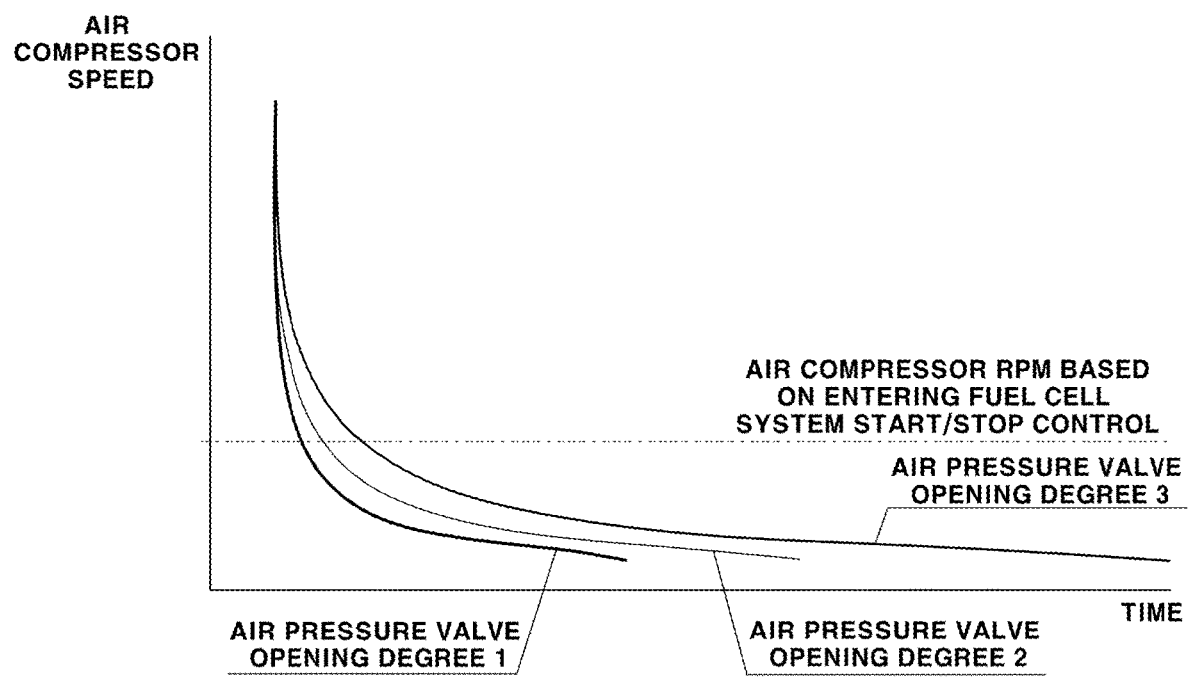
FIG. 6 illustrates a speed profile representing a current speed over time during deceleration for stopping first and second air compressors.

As described above with reference to FIG. 1, the first air supply system 120 of the first fuel cell system 100 includes the first air compressor 121, the first inverter 122, and the first air pressure valve 130 mounted at the outlet of the cathode of the first fuel cell stack 110, and the second air supply system 220 of the second fuel cell system 200 also includes the second air compressor 221, the second inverter 222, and the second air pressure valve 230 mounted at the outlet of the cathode of the second fuel cell stack 210. Accordingly, as illustrated in FIG. 6, it is possible to obtain, through mapping experiments, a speed profile representing a current speed over time during deceleration for stopping the first and second air compressors 121 and 221, according to the opening degrees of the first and second air pressure valves 130 and 230. In addition, it is possible to measure, from the obtained speed profile, the stop times of the first and second air compressors 121 and 221 according to the opening degrees of the first and second air pressure valves 130 and 230.

The map table may be composed of a speed profile representing a current speed over time during deceleration for stopping the first and second air compressors, according to the opening degree of the first air pressure valve mounted at the outlet of the cathode of the first fuel cell stack and the opening degree of the second air pressure valve mounted at the outlet of the cathode of the second fuel cell stack.

Thus, the map table may be established through the mapping experiments and may be stored in the controller in order to obtain the stop time M1_T_hold of the first air compressor and the stop time M2_T_hold of the second air compressor.

Next, the controller determines a first delay time P1_T_hold when entering first fuel cell system stop control and a second delay time P2_T_hold when entering second fuel cell system stop control.

The first delay time P1_T_hold may be determined based on the stop time M1_T_hold until the first air compressor stops and the time for which the rotor initial position alignment function is performed for checking the position of the rotor of the motor included in the first air compressor. The second delay time P2_T_hold may be determined in response to the stop time M2_T_hold until the second air compressor stops and the time for which the rotor initial position alignment function is performed for checking the position of the rotor of the motor included in the second air compressor.

To this end, the controller compares a difference Abs(M1_T_hold−M2_T_hold) between the first air compressor stop time M1_T_hold and the second air compressor stop time M2_T_hold with a rotor alignment delay time T_align at S104.

The rotor alignment delay time T_align refers to a time for which rotor initial position alignment is performed for checking the position of the rotor of the motor.

As a result of the comparison in step S104, if the difference Abs(M1_T_hold−M2_T_hold) is equal to or greater than the rotor alignment delay time T_align, it is determined that the first delay time P1_T_hold when entering the first fuel cell system stop control does not overlap with the second delay time P2_T_hold when entering the second fuel cell system stop control, so that the first delay time P1_T_hold is determined to be zero (P1_T_hold=0) and the second delay time P2_T_hold is also determined to be zero (P2_T_hold=0) at S105.

Figure 10:
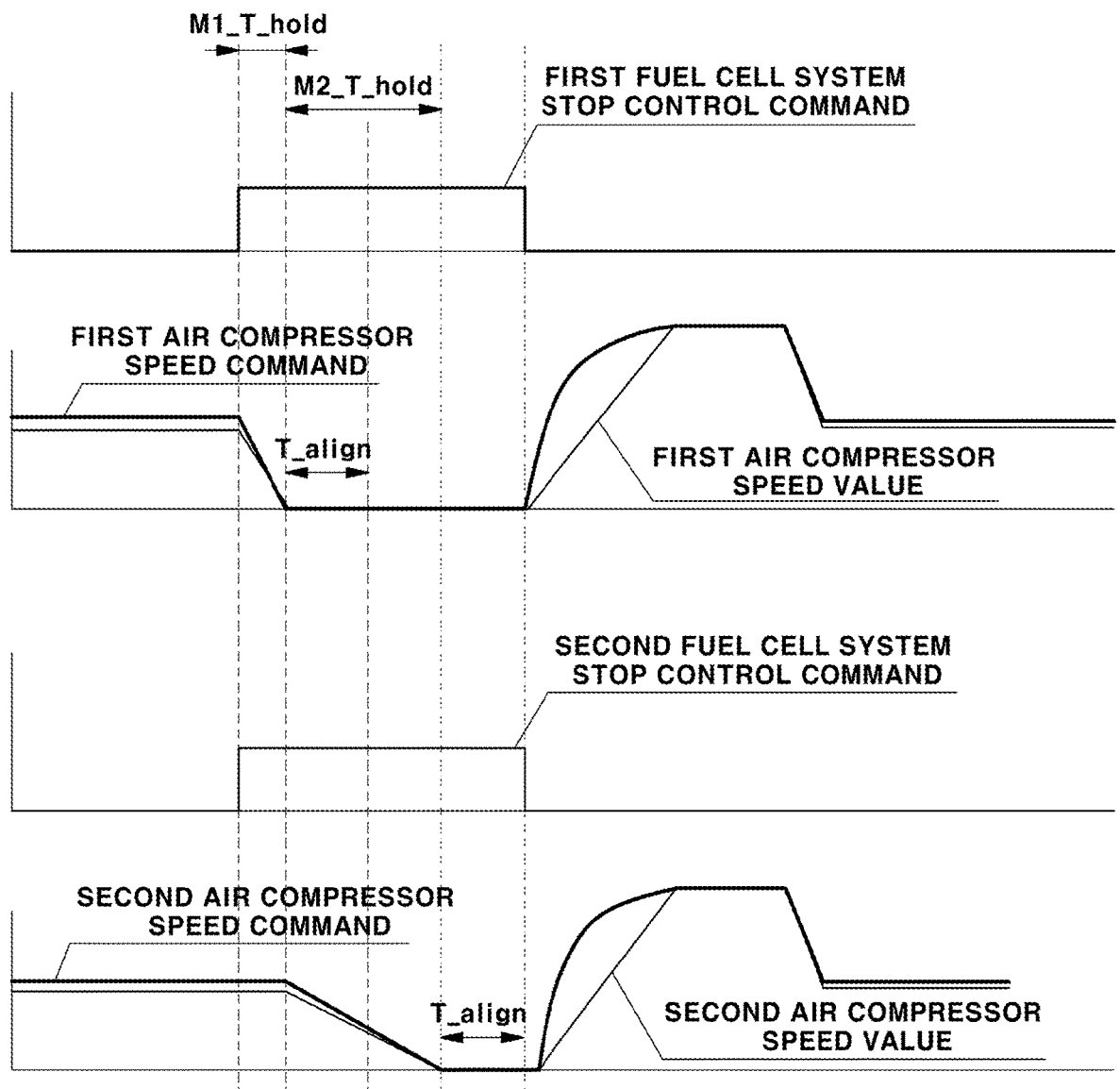
FIGS. 10 and 11 are control graphs illustrating a method of controlling start/stop of a fuel cell system according to the present disclosure.

Here, when the first delay time P1_T_hold when entering the first fuel cell system stop control does not overlap with the second delay time P2_T_hold when entering the second fuel cell system stop control, it means that the rotor initial position alignment execution time T_align of the motor included in the first air compressor does not overlap with the rotor initial position alignment execution time T_align of the motor included in the second air compressor, as illustrated in the control graph of FIG. 10.

Accordingly, when the first delay time P1_T_hold is determined to be zero (P1_T_hold=0) and the second delay time P2_T_hold is also determined to be zero (P2_T_hold=0) in step S105, the controller simultaneously commands the stop controls for the first and second fuel cell systems at S106.

For example, the uppermost controller of the fuel cell vehicle simultaneously commands the first fuel cell controller for the first fuel cell system and the second fuel cell controller for the second fuel cell system, respectively, to perform the stop controls for the first and second fuel cell systems.

Accordingly, the first fuel cell system stop control for stopping the first air compressor and the second fuel cell system stop control for stopping the second air compressor are simultaneously performed in response to the command in step S106, so that stop modes of the first and second fuel cell systems are simultaneously performed at S107.

On the other hand, as a result of the comparison in step S104, if the difference Abs(M1_T_hold−M2_T_hold) between the first air compressor stop time M1_T_hold and the second air compressor stop time M2_T_hold is less than the rotor alignment delay time T_align, the rotor initial position alignment execution time of the motor included in the first air compressor may overlap with the rotor initial position alignment execution time of the motor included in the second air compressor. Therefore, in order to prevent this issue, the controller first compares the first air compressor stop time M1_T_hold with the second air compressor stop time M2_T_hold at S108.

As a result of the comparison in step S108, if the first air compressor stop time M1_T_hold is less than the second air compressor stop time M2_T_hold, the controller determines the first delay time P1_T_hold to be zero (P1_T_hold=0) and determines the second delay time P2_T_hold to be a value T_align−Abs(M1_T_hold−M2_T_hold) obtained by subtracting the difference Abs(M1_T_hold−M2_T_hold) from the rotor alignment delay time T_align at S109.

Figure 11:
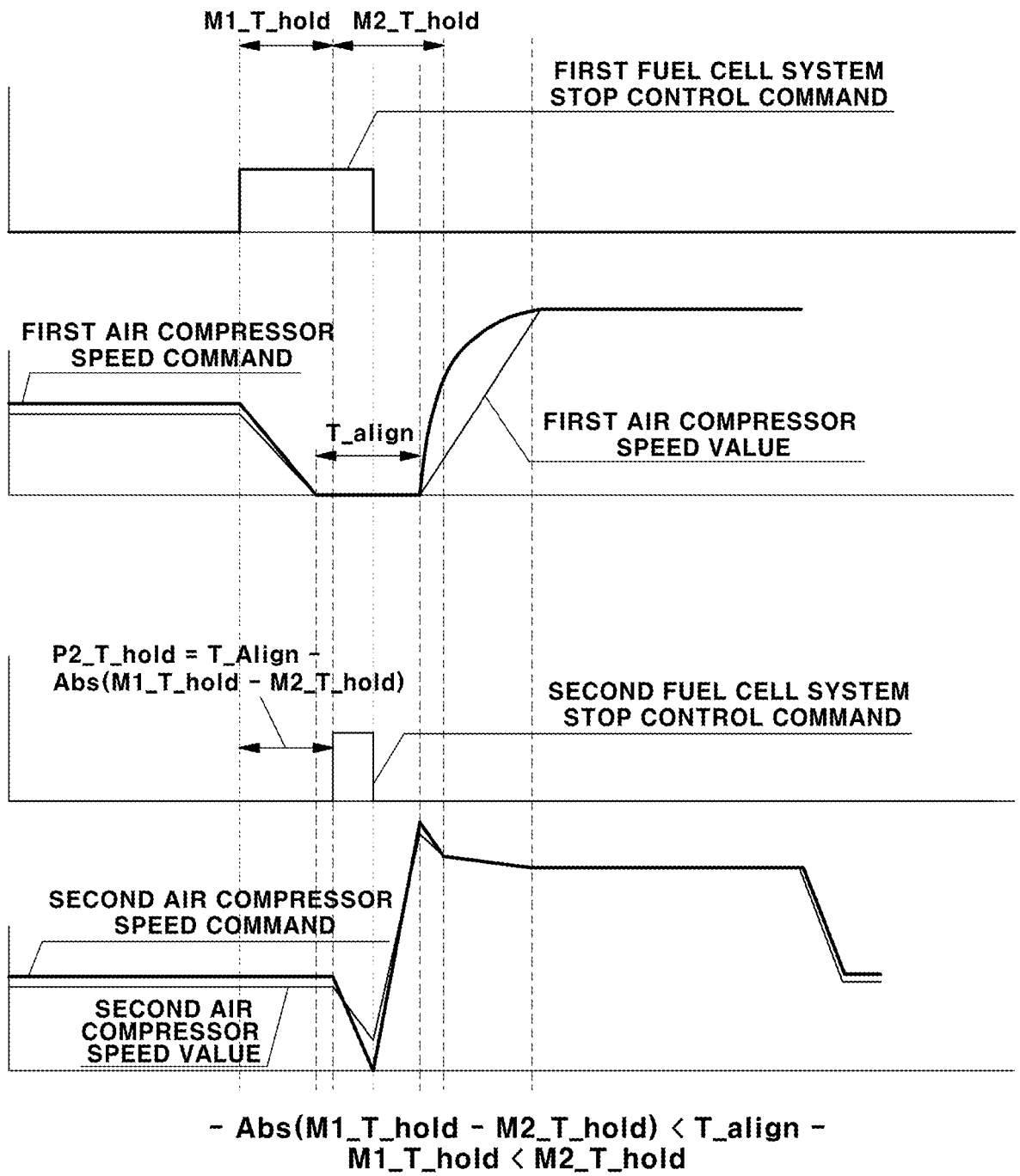

Accordingly, when the first delay time P1_T_hold is determined to be zero (P1_T_hold=0) and the second delay time P2_T_hold is determined to be the value T_align−Abs(M1_T_hold−M2_T_hold) obtained by subtracting the difference Abs(M1_T_hold−M2_T_hold) from the rotor alignment delay time T_align in step S109, the controller first commands the first fuel cell system stop control as illustrated in FIG. 11 at S110.

Next, after the second delay time [P2_T_hold=T_align−Abs(M1_T_hold−M2_T_hold)], the controller then commands the second fuel cell system stop control as illustrated in FIG. 11 at S111.

Accordingly, the first fuel cell system stop control for stopping the first air compressor is first performed in response to the command of the controller in step S110, and the second fuel cell system stop control for stopping the second air compressor is then performed in response to the command of the controller in step S111. Thus, stop modes of the first and second fuel cell systems are sequentially performed at S112.

At this time, when the output of the fuel cell system is required (when the current of the fuel cell stack is required) when the first fuel cell system stop control is first performed, the speed of the second air compressor of the second fuel cell system, the stop control of which is not yet performed, is increased very quickly so that the second fuel cell system can produce the same output as in the normal mode of operation, as illustrated in FIG. 11.

As described above, when the first fuel cell system stop control is first performed and the second fuel cell system stop control is then performed, the output current of the fuel cell stack included in the second fuel cell system may be available when the current of the fuel cell stack is required. Therefore, it is possible to minimize the delay in output response of the fuel cell system during start/stop control for the parallel fuel cell system.

On the other hand, as a result of the comparison in step S108, if the first air compressor stop time M1_T_hold is greater than the second air compressor stop time M2_T_hold, that is, if the second air compressor stop time M2_T_hold is less than the first air compressor stop time M1_T_hold, the controller determines the second delay time P2_T_hold to be zero (P2_T_hold=0) and determines the first delay time P1_T_hold to be a value T_align−Abs(M1_T_hold−M2_T_hold) obtained by subtracting the difference Abs(M1_T_hold−M2_T_hold) from the rotor alignment delay time T_align at S113.

Accordingly, when the second delay time P2_T_hold is determined to be zero (P2_T_hold=0)) and the first delay time P1_T_hold is determined to be the value T_align−Abs(M1_T_hold−M2_T_hold) obtained by subtracting the difference Abs(M1_T_hold−M2_T_hold) from the rotor alignment delay time T_align in step S113, the controller first commands the second fuel cell system stop control at S114.

Next, after the first delay time [P1_T_hold=T_align−Abs(M1_T_hold−M2_T_hold)], the controller then commands the first fuel cell system stop control at S115.

Accordingly, the second fuel cell system stop control for stopping the second air compressor is first performed in response to the command of the controller in step S114, and the first fuel cell system stop control for stopping the first air compressor is then performed in response to the command of the controller in step S115. Thus, stop modes of the second and first fuel cell systems are sequentially performed at S116.

As described above, when the second fuel cell system stop control is first performed and the first fuel cell system stop control is then performed, the output current of the fuel cell stack included in the first fuel cell system may be available when the current of the fuel cell stack is required. Therefore, it is possible to minimize the delay in output response of the fuel cell system during start/stop control for the parallel fuel cell system.

As described above, the method determines in advance the delay time during stop control for the parallel fuel cell system including two or more fuel cell systems, namely, the first delay time P1_T_hold when entering the first fuel cell system stop control and the second delay time P2_T_hold when entering the second fuel cell system stop control, and sequentially performs stop controls for the first and second fuel cell systems without simultaneously performing them based on each of the determined delay times. Therefore, it is possible to minimize output delay of each fuel cell system by the fuel cell system start/stop control.

In addition, when the stop controls for the first and second fuel cell systems are simultaneously performed, the fuel cell stack included in the first fuel cell system and the fuel cell stack included in the second fuel cell system may be simultaneously deteriorated, which may lead to a decrease in power generation efficiency in the stacks. However, the present disclosure can prevent the fuel cell stack included in the first fuel cell system and the fuel cell stack included in the second fuel cell system from being simultaneously deteriorated by first performing the first fuel cell system stop control and then performing the second fuel cell system stop control. Therefore, the present disclosure can contribute to preventing deterioration in each fuel cell stack and improving efficiency by performing the fuel cell system start/stop control.

Hereinafter, a method for start (restart) control in the fuel cell system start/stop control according to the present disclosure will be described.

Figure 8:
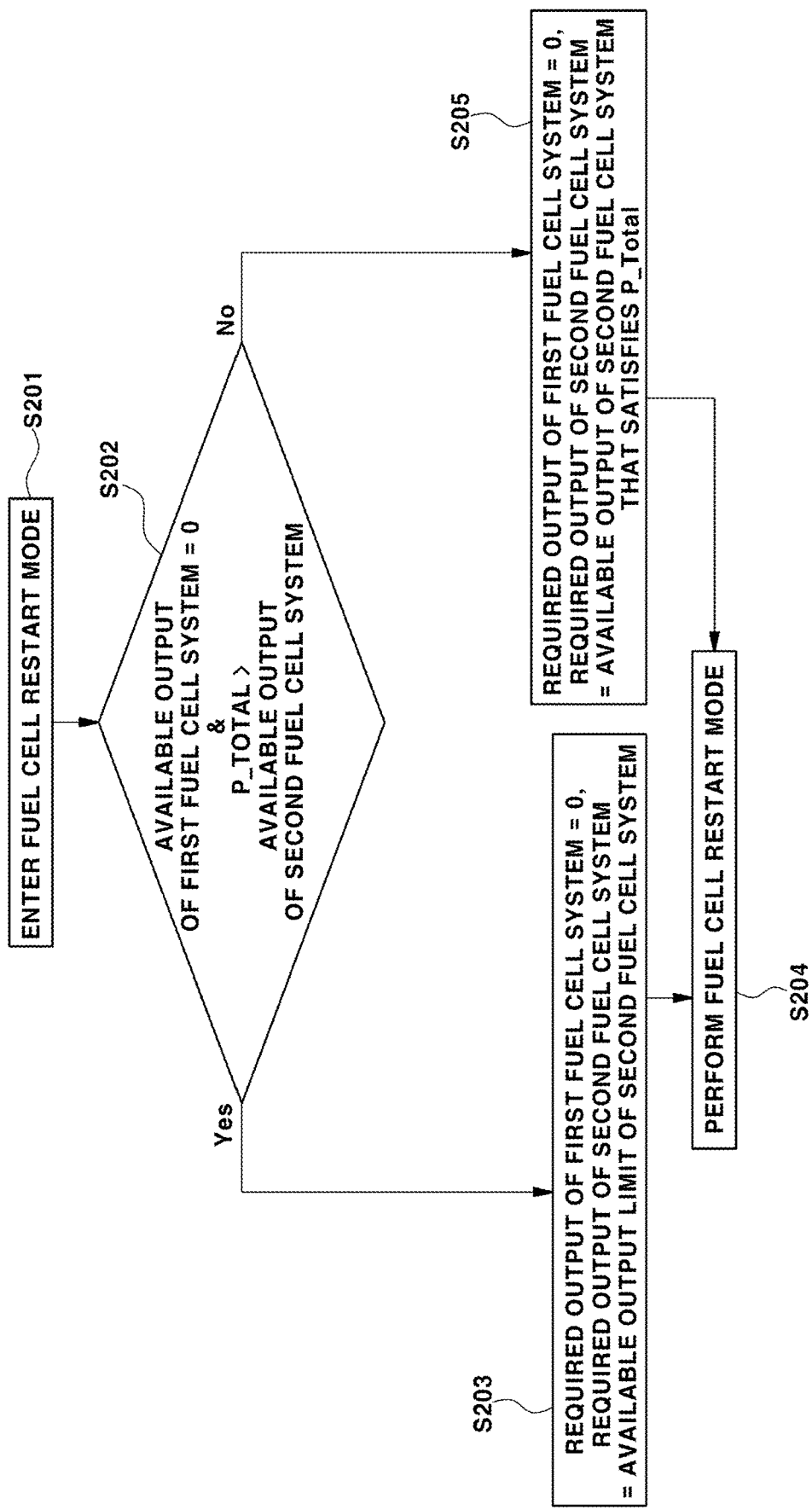
FIGS. 8 and 9 are flowcharts illustrating a method for restart control in the fuel cell system start/stop control according to the present disclosure.
Figure 9:
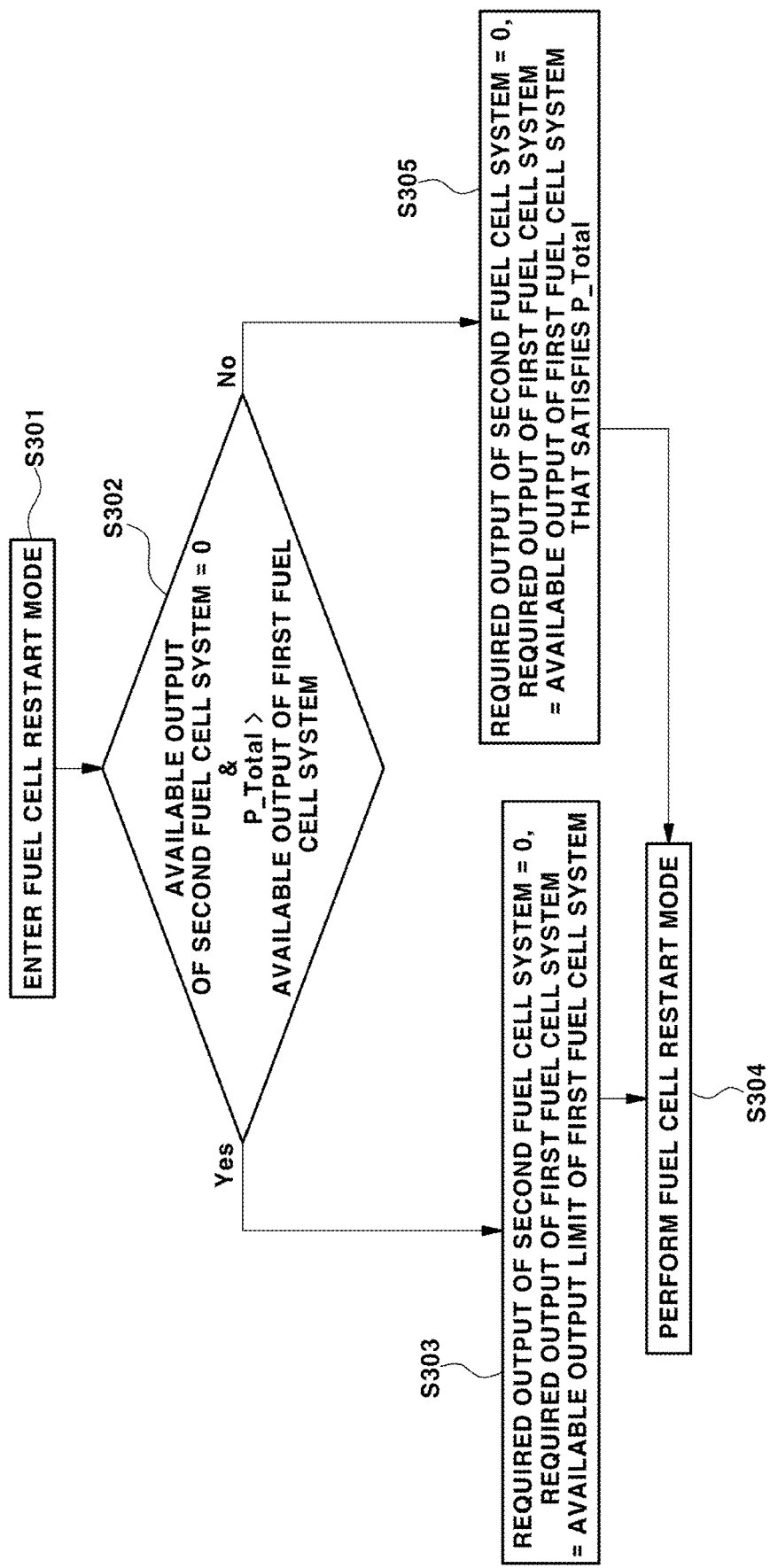

FIGS. 8 and 9 are flowcharts illustrating a method for restart control in the fuel cell system start/stop control according to the present disclosure.

In the parallel fuel cell system including the first and second fuel cell systems, the total output required for the normal mode of operation is distributed between the first fuel cell system and the second fuel cell system.

That is, the total required output P_Total in the normal mode of operation is determined as the sum of the required output P_Total_Total normal mode of operation is determined as the sum of P_Total_Total normal mode of operation is de In this case, as described above, when the output of the fuel cell system is required (when the current of the fuel cell stack is required) when the stop controls for the first and second fuel cell systems are not performed simultaneously, but sequentially, there exists a fuel cell system capable of responding to fuel cell restart.

For example, when the first fuel cell system stop control is first performed and the second fuel cell system stop control is then performed, the fuel cell system capable of responding to fuel cell restart may be a second fuel cell system.

In the case where the stop controls for the two or more fuel cell systems are sequentially performed, when the output of the fuel cell system is required, the process may enter a fuel cell restart mode.

In other words, when the output of the fuel cell system is required (when the current of the fuel cell stack is required) when the stop controls for the first and second fuel cell systems are sequentially performed, the controller enters the fuel cell restart mode at S201.

Next, if the controller is in a state where the first fuel cell system is under stop control and the second fuel cell system does not yet enter stop control, it is determined whether the available output of the first fuel cell system is zero (0) and whether the total output P_Total required for the fuel cell system is greater than the available output of the second fuel cell system at S202.

As a result of the determination in step S202, if the available output of the first fuel cell system is zero (0) and the total output P_Total required for the fuel cell system is greater than the available output of the second fuel cell system, the controller determines the required output of the first fuel cell system to be zero (0) and determines the required output of the second fuel cell system to be an available output limit of the second fuel cell system at S203.

The fuel cell restart may be performed based on the available output limit of the second fuel cell system determined in step S203 at S204.

On the other hand, if it is determined in step S202 that the available output of the first fuel cell system is zero (0) and the total output P_Total required for the fuel cell system is less than the available output of the second fuel cell system, the controller determines the required output of the first fuel cell system to be zero (0) and determines the required output of the second fuel cell system to be the available output of the second fuel cell system that satisfies the total required output P_Total at S205.

The fuel cell restart may be performed based on the available output of the second fuel cell system that satisfies the total required output P_Total determined in step S205 at S204.

Meanwhile, when the output of the fuel cell system is required (when the current of the fuel cell stack is required) when the stop controls for the second and first fuel cell systems are sequentially performed, the controller enters the fuel cell restart mode at S301.

Next, if the controller is in a state where the second fuel cell system is under stop control and the first fuel cell system does not yet enter stop control, it is determined whether the available output of the second fuel cell system is zero (0) and whether the total output P_Total required for the fuel cell system is greater than the available output of the first fuel cell system at S302.

As a result of the determination in step S302, if the available output of the second fuel cell system is zero (0) and the total output P_Total required for the fuel cell system is greater than the available output of the first fuel cell system, the controller determines the required output of the second fuel cell system to be zero (0) and determines the required output of the first fuel cell system to be an available output limit of the first fuel cell system at S303.

The fuel cell restart may be performed based on the available output limit of the first fuel cell system determined in step S303 at S304.

On the other hand, if it is determined in step S302 that the available output of the second fuel cell system is zero (0) and the total output P_Total required for the fuel cell system is less than the available output of the first fuel cell system, the controller determines the required output of the second fuel cell system to be zero (0) and determines the required output of the first fuel cell system to be the available output of the first fuel cell system that satisfies the total required output P_Total at S305.

The fuel cell restart may be performed based on the available output of the first fuel cell system that satisfies the total required output P_Total determined in step S305 at S304.

As described above, when the output of the fuel cell system is required, when the stop controls for the first and second fuel cell systems are sequentially performed or when the stop controls for the second and first fuel cell systems are sequentially performed, the available output limit of the first fuel cell system or the available output limit of the second fuel cell system may satisfy the total required output to some extent even if the total output P_Total required for the fuel cell system is greater than the available output of the first or second fuel cell system. Therefore, the fuel cell restart can be responded without delay during stop control for the parallel fuel cell system.

In particular, when the total output P_Total required for the cell system is less than the available output of the first or second fuel cell system, when the stop controls for the first and second fuel cell systems are sequentially performed or when the stop controls for the second and first fuel cell systems are sequentially performed, the available output of the first or second fuel cell system may sufficiently satisfy the total output P_Total required for the fuel cell system. Therefore, the fuel cell restart can be further responded without delay during stop control for the parallel fuel cell system.

As is apparent from the above description, the present disclosure provides the following effects.

Sequentially performing stop controls for the constituent first and second fuel cell systems of the parallel fuel cell system enables the output current of the fuel cell stack to be available when the current of the fuel cell stack is required. Therefore, it is possible to minimize the delay in output response of the fuel cell system during the stop control for the parallel fuel cell system and to achieve deterioration prevention and efficiency improvement of the fuel cell stack by the fuel cell system start/stop control.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A method of controlling start/stop of a parallel fuel cell system, comprising:
    calculating a delay time until each fuel cell system stops during stop controls for two or more fuel cell systems of a parallel fuel cell system;
    sequentially performing the stop controls for the two or more fuel cell systems based on the calculated delay time when each of the two or more fuel cell systems has a different delay time, or simultaneously performing the stop controls for the two or more fuel cell systems based on the calculated delay time when each of the two or more fuel cell systems has a same delay time; and
    entering a fuel cell restart mode while a current output of each fuel cell system is required while the stop controls for the two or more fuel cell systems are performed sequentially, or while the stop controls for the two or more fuel cell systems are simultaneously performed.

2. The method of claim 1, wherein calculating a delay time comprises:
    determining, from a map table of a controller, a stop time until a first air compressor of a first fuel cell system stops and a stop time until a second air compressor of a second fuel cell system stops;

determining a first delay time based on the stop time until the first air compressor stops and a time for which a rotor initial position alignment function is performed for checking a position of a rotor of a first motor positioned in the first air compressor; and determining a second delay time based on the stop time until the second air compressor stops, and a time for which a rotor initial position alignment function is performed for checking a position of a rotor of a second motor positioned in the second air compressor.

3. The method of claim 2, wherein the map table is composed of a speed profile representing a current speed over time during deceleration for stopping the first and second air compressors, according to an opening degree of a first air pressure valve mounted at an outlet of a cathode of a first fuel cell stack and an opening degree of a second air pressure valve mounted at an outlet of a cathode of a second fuel cell stack.

4. The method of claim 2, wherein when a difference between the stop time of the first air compressor and the stop time of the second air compressor is equal to or greater than a rotor alignment delay time, it is determined that the first delay time does not overlap with the second delay time so that the first delay time is determined to be zero and the second delay time is also determined to be zero.

5. The method of claim 4, wherein when the first delay time is determined to be zero and the second delay time is also determined to be zero, the controller simultaneously commands stop controls for the first and second fuel cell systems to simultaneously perform a first fuel cell system stop mode and a second fuel cell system stop mode.

6. The method of claim 2, wherein when a difference between the stop time of the first air compressor and the stop time of the second air compressor is less than a rotor alignment delay time, and when the stop time of the second air compressor is less than the stop time of the first air compressor, the first delay time is determined to be zero and the second delay time is determined to be a value obtained by subtracting the difference from the rotor alignment delay time.

7. The method of claim 6, wherein when the first delay time is determined to be zero and the second delay time is determined to be the value obtained by subtracting the difference from the rotor alignment delay time, the controller first commands first fuel cell system stop control and then commands second fuel cell system stop control after the second delay time, to first perform a first fuel cell system stop mode and then perform a second fuel cell system stop mode in sequence.

8. The method of claim 2, wherein when a difference between the stop time of the first air compressor and the stop time of the second air compressor is less than a rotor alignment delay time, and when the stop time of the first air compressor is less than the stop time of the second air compressor, the second delay time is determined to be zero and the first delay time is determined to be a value obtained by subtracting the difference from the rotor alignment delay time.

9. The method of claim 2, wherein when a difference between the stop time of the first air compressor and the stop time of the second air compressor is less than a rotor alignment delay time, and when the stop time of the first air compressor is less than the stop time of the second air compressor, the second delay time is determined to be zero and the first delay time is determined to be a value obtained by subtracting the difference from the rotor alignment delay time.

10. The method of claim 1, wherein when an output of each fuel cell system is required when stop controls for first and second fuel cell systems of the two or more fuel cell systems are sequentially performed, after the entering a fuel cell restart mode, the method further performs determining whether an available output of the first fuel cell system is zero and whether a total required output for each fuel cell system is greater than an available output of the second fuel cell system.

11. The method of claim 10, wherein when the available output of the first fuel cell system is zero and the total required output for each fuel cell system is greater than the available output of the second fuel cell system, the method further performs:

determining a required output of the first fuel cell system to be zero and determining a required output of the second fuel cell system to be an available output limit of the second fuel cell system; and executing fuel cell restart in response to the determined available output limit of the second fuel cell system.

12. The method of claim 10, wherein when the available output of the first fuel cell system is zero and the total required output for each fuel cell system is less than the available output of the second fuel cell system, the method further performs:

determining a required output of the first fuel cell system to be zero and determining a required output of the second fuel cell system to be an available output of the second fuel cell system that satisfied the total required output; and executing fuel cell restart in response to the determined available output of the second fuel cell system that satisfied the total required output.

13. The method of claim 1, wherein when an output of each fuel cell system is required when stop controls for second and first fuel cell systems of the two or more fuel cell systems are sequentially performed, after the entering a fuel cell restart mode, the method further performs:

determining whether an available output of the second fuel cell system is zero and whether a total required output for each fuel cell system is greater than an available output of the first fuel cell system.

14. The method of claim 13, wherein when the available output of the second fuel cell system is zero and the total output required for each fuel cell system is greater than the available output of the first fuel cell system, the method further performs:

determining a required output of the second fuel cell system to be zero and determining a required output of the first fuel cell system to be an available output limit of the first fuel cell system; and executing fuel cell restart in response to the determined available output limit of the first fuel cell system.

15. The method of claim 13, wherein when the available output of the second fuel cell system is zero and the total required output for each fuel cell system is less than the available output of the first fuel cell system, the method further performs:

determining a required output of the second fuel cell system to be zero and determining a required output of the first fuel cell system to be an available output of the first fuel cell system that satisfied the total required output; and executing fuel cell restart in response to the determined available output of the first fuel cell system that satisfied the total required output.

\* \* \* \* \*